United States Patent
Dietze et al.

(10) Patent No.: US 10,907,076 B2
(45) Date of Patent: Feb. 2, 2021

(54) REACTIVE TWO-COMPONENT ADHESIVE SYSTEM IN THE FORM OF A FILM AND BONDING METHOD

(71) Applicant: TESA SE, Norderstedt (DE)

(72) Inventors: Sebastian Dietze, Hamburg (DE); Arne Koops, Neu-Lankau (DE); Gero Maatz, Düsseldorf (DE); Uwe Schümann, Pinneberg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 15/780,343

(22) PCT Filed: Nov. 24, 2016

(86) PCT No.: PCT/EP2016/078743
§ 371 (c)(1),
(2) Date: May 31, 2018

(87) PCT Pub. No.: WO2017/102282
PCT Pub. Date: Jun. 22, 2017

(65) Prior Publication Data
US 2018/0355215 A1 Dec. 13, 2018

(30) Foreign Application Priority Data
Dec. 18, 2015 (DE) .................. 10 2015 225 854

(51) Int. Cl.
*C09J 5/04* (2006.01)
*C09J 5/00* (2006.01)
*B32B 15/04* (2006.01)
*B32B 29/00* (2006.01)
*B32B 7/12* (2006.01)
*B32B 15/20* (2006.01)
*B32B 15/12* (2006.01)
*C09J 7/28* (2018.01)
*C09J 7/20* (2018.01)
*C09J 7/30* (2018.01)

(52) U.S. Cl.
CPC ..................... *C09J 5/04* (2013.01); *B32B 7/12* (2013.01); *B32B 15/04* (2013.01); *B32B 15/12* (2013.01); *B32B 15/20* (2013.01); *B32B 29/005* (2013.01); *C09J 5/00* (2013.01); *C09J 7/20* (2018.01); *C09J 7/28* (2018.01); *C09J 7/30* (2018.01); *B32B 2250/03* (2013.01); *B32B 2255/12* (2013.01); *B32B 2255/20* (2013.01); *B32B 2255/205* (2013.01); *B32B 2255/26* (2013.01); *B32B 2255/28* (2013.01); *B32B 2405/00* (2013.01); *C09J 2301/416* (2020.08); *C09J 2400/123* (2013.01); *C09J 2400/163* (2013.01)

(58) Field of Classification Search
CPC ......... C09J 5/04; C09J 7/20; C09J 7/28; C09J 7/30; C09J 2400/123; C09J 2400/163; C09J 2205/31; C09J 5/00; C09J 5/02; B32B 7/12; B32B 29/005; B32B 15/20; B32B 15/12; B32B 15/04; B32B 2405/00; B32B 2255/28; B32B 2255/20; B32B 2250/03; B32B 2255/26; B32B 2255/205; B32B 2255/12

See application file for complete search history.

(56) References Cited

U.S. PATENT DOCUMENTS

| | | | |
|---|---|---|---|
| 4,647,156 A * | 3/1987 | Fujimura | G02F 1/1339 349/153 |
| 9,834,707 B2 | 12/2017 | Schümann et al. | |
| 2013/0015487 A1* | 1/2013 | Okuno | H01L 33/20 257/98 |
| 2015/0035903 A1* | 2/2015 | Zuo | B41J 2/1634 347/44 |
| 2016/0108287 A1 | 4/2016 | Schümann et al. | |
| 2016/0264823 A1 | 9/2016 | Schümann et al. | |

FOREIGN PATENT DOCUMENTS

| | | | |
|---|---|---|---|
| DE | 10 2013 222 278 A1 | | 5/2015 |
| EP | 0 300 847 A1 | | 1/1989 |
| EP | 2759578 A1 | * | 7/2014 |
| JP | 51-9131 | | 1/1976 |

(Continued)

OTHER PUBLICATIONS

EP-2759578-A1 (published Jul. 30, 2014) Machine Translation of Description (EP and Google).*

(Continued)

*Primary Examiner* — Michael N Orlando
*Assistant Examiner* — Cynthia L Schaller
(74) *Attorney, Agent, or Firm* — Norris McLaughlin, P.A.

(57) ABSTRACT

Method of adhesively bonding two surfaces by means of a reactive adhesive film system comprising at least two adhesive films (F1 and F2), each comprising at least one reactive component (R1 and R2), adhesive bonding being effected by a reaction which requires the presence of both reactive components (R1 and R2), wherein, prior to adhesive bonding, a separating layer (T) which is impermeable to the reactive components is provided between the adhesive films which are to be brought into contact with one another for the reaction, and the separating layer (T) is removed at least in part by means of a laser in order to effect bonding, so that the adhesive films (F1 and F2) come into direct contact with one another and the reaction begins in the presence of both reactive components (R1 and R2), and reactive adhesive film system for use in this method.

26 Claims, No Drawings

(56) References Cited

FOREIGN PATENT DOCUMENTS

| | | |
|---|---|---|
| JP | 2010-77307 A | 4/2010 |
| WO | 2014/202402 A1 | 9/2014 |
| WO | 2015/062809 A1 | 5/2015 |

OTHER PUBLICATIONS

JP 2010077307 Machine Translation of Description (EPO and Google).*
Gragossian, et al., "Laser Ablation of Aluminum from Normal Evaporation to Phase Explosion," J. Appl. Phys. 105, 103304. (Year: 2009).*
International Search Report dated Feb. 3, 2017 mailed Feb. 15, 2017.
English translation of International Search Report dated Feb. 3, 2017 mailed Feb. 15, 2017.
Translation of Office Action dated Sep. 23, 2019, in connection with Korean Application No. 10-2018-7020552.

* cited by examiner

REACTIVE TWO-COMPONENT ADHESIVE SYSTEM IN THE FORM OF A FILM AND BONDING METHOD

This is a 371 of PCT/EP2016/078743 filed 24 Nov. 2016, which claims foreign priority benefit under 35 U.S.C. 119 of German Patent Application 10 2015 225 854.8 filed Dec. 18, 2015, the entire contents of which are incorporated herein by reference.

The present invention relates to a method of adhesively bonding various materials, such as, for example, metal, wood, glass and/or plastics material, using a two-component adhesive system in film form. This two-component adhesive system comprises two reactive adhesive films, each of which comprises a reactive component, adhesive bonding being effected by a reaction which requires the presence of both reactive components. The invention relates further to such a two-component adhesive system itself.

BACKGROUND OF THE INVENTION

Two-component adhesive systems have generally been known for many years and are described extensively in the specialist literature. In such systems, an adhesive system consisting of two components is applied to the parts to be adhesively bonded, there conventionally being used two liquid components. For example, in chemically reacting 2-component polymerization adhesive systems, one component consists of the monomer to be polymerized and an activator, and the other component consists of a radical-forming substance (also called a curing agent or initiator) and the monomer to be polymerized. After the two components have been thoroughly mixed, or at least brought into contact, and activated, which in most cases is carried out thermally, the radical-forming substance is cleaved into two radicals by the activator and the polymerization reaction of the monomers to be polymerized begins. The radical chain polymerization of the monomer then takes place to chain termination and the adhesive composition cures, whereby permanent adhesive bonding of the parts to be adhesively bonded is achieved.

A disadvantage of such liquid 2-component polymerization adhesive systems is that they are often not clean to use since the two components in most cases have to be applied in liquid to pasty form to the parts to be adhesively bonded. This is a problem above all in the case of adhesive bonds over large areas and/or in applications in which the surfaces are uneven, for example sloping. In addition, activation of the adhesive system generally takes place at elevated temperatures, which can be a problem for sensitive substrates. A further disadvantage of such systems is that the storage stability of the two components can be critical. Moreover, conventional 2-component polymerization adhesive systems are frequently accompanied, following complete curing, by problems which only become apparent in the case of vibrations. For example, in the case of the systems of the prior art, cracks or fractures can occur in the region of the adhesive bonds due to powerful vibrations.

EP 300 847 A offers a two-component adhesive system in film form. In that system, two components are again provided which, when brought into contact with one another, can be made to react, a crosslinked polymer having pressure sensitive adhesive properties being formed. At least one of the components is provided in the form of a film.

Similar concepts are proposed in specifications DE 10 2013 211 319 A and DE 10 2013 222 278 A. The former describes a reactive adhesive film system comprising two reactive adhesive films (here called A and B), the first reactive film A containing, in addition to a polymeric film former matrix, a radical initiator, and the second reactive film B containing, in addition to a polymeric film former matrix, an activator. In the second-mentioned specification there is used as the activator a manganese(II), iron(II) or cobalt(II) complex which contains porphyrin, porphyrazine, phthalocyanine or derivatives thereof as ligands.

The above-mentioned systems all have the disadvantage that they must always be supplied and used in the form of two components. Either two liquids are applied, or a film is fixed and a liquid is applied for adhesive bonding, or two films are adhesively bonded to the substrates to be adhesively bonded and then brought together at the moment of adhesive bonding. However, there are in each case two separate components which must not be brought together until the time of adhesive bonding.

The two components are thus only brought together shortly before use by the user himself. Complex laminating processes are thereby required, in which accuracy of fit is important. In particular for multilayer systems (more than two components, for example layer structures of the type A-B-A or even more layers), which result in greater layer thicknesses, the user is faced with high demands.

A large number of adhesive tapes which are of single-part construction are known on the market. Such single-part adhesive tapes are in particular of single- or multi-layer construction and can be adhesive on one side or on both sides. They are generally used and applied as supplied—where appropriate after removal of protective or covering layers. Adhesive tapes of single-part construction are mainly supplied in the form of self-adhesive tapes or in the form of adhesive tapes which are initially not adhesive or not very adhesive but are activatable, the latter being converted into their adhesive form chemically and/or by physical treatment, for example, or the final adhesive force being brought about by corresponding treatment.

The advantage of two-component systems over single-part adhesive tapes is that the individual components can initially be stored and applied independently of one another. Adhesive bonding only takes place once the components have been brought together. On the other hand, however, such systems are generally less easy to handle, as has already been described in detail above.

Activatable single-part adhesive tapes can also lead to the formation of high adhesive bonding strengths, but they require all the constituents required for bonding to be present in one layer from the outset (single-component systems). As a result, they are limited to suitable chemical compositions/blends, while the use of two-component systems frequently only requires the components to be brought together in order to effect adhesive bonding. Since activation generally takes place in the composite with the substrates after the activatable adhesive tapes have been applied, these systems are frequently not suitable for use in conjunction with very sensitive substrates, so that a user is dependent on self-adhesive systems in such cases.

Accordingly, the object underlying the present invention is to provide a method of adhesively bonding substrates or surfaces in which the advantages of two- or multi-component systems can be combined with those of a single-component adhesive tape. A further part of the object is to provide a suitable adhesive tape.

SUMMARY

It has been possible to achieve the object by means of a method in which there is used for adhesively bonding two surfaces a reactive adhesive film system comprising at least two adhesive films (F1 and F2), the adhesive films each comprising at least one reactive component (R1 and R2). Adhesive bonding is effected by a reaction which requires the presence of both reactive components (R1 and R2). The method is characterized in that, prior to adhesive bonding, a separating layer (T) which is impermeable to the reactive components (R1 and R2) is provided between the adhesive films (F1 and F2) which are to be brought into contact with one another for the reaction, which separating layer is removed at least in part by means of a laser only in order to effect adhesive bonding. The adhesive films (F1 and F2) thereby come into direct contact with one another and the reaction starts in the presence of the two reactive components (R1 and R2).

The invention relates further to a reactive adhesive film system comprising at least two adhesive films (F1 and F2), each of the adhesive films comprising at least one reactive component (R1 and R2). The adhesive film system is so chosen that activation of the adhesive film system is effected by a reaction which requires the presence of both reactive components (R1 and R2). Between the adhesive films (F1 and F2) which are to be brought into contact with one another for the reaction there is provided a separating layer (T) which is impermeable to the reactive components (R1 and R2), so that activation of the adhesive film system is initially prevented.

Advantageous procedures and forms of the adhesive film system according to the invention are further described.

DETAILED DESCRIPTION OF THE INVENTION

According to the invention, the problem outlined above is solved by a method in which there is used a reactive adhesive film system—also referred to hereinbelow as an "adhesive system" for short—which has at least two adhesive films (F1, F2). Each of these adhesive films comprises at least one reactive component (R1 or R2). The adhesive system is so chosen that it is not tacky or does not develop the desired final adhesive force at the outset but first requires activation in order to develop tackiness or to generate desired adhesive forces. Accordingly, the term "adhesive" in the sense of the adhesive films is to be understood as meaning a substance which either does not develop its adhesive properties until it has been activated or in which a certain (in particular weak) tackiness is present at the outset but the adhesive forces are not formed to the required degree until after activation. The expression "effecting adhesive bonding" is understood as meaning the process by which the substance develops its adhesive properties or in which the adhesive forces are formed to the sufficient degree.

Activation takes place by means of a reaction which requires the presence of both reactive components in the reaction system, that is to say in which the two reactive components are able to come into contact with one another. The corresponding reaction is therefore also referred to within the context of this specification as the "activation reaction".

As long as the reactive components do not come into contact with one another, a reaction which first effects activation of the adhesive system—that is to say the activation reaction—cannot start. Only after the two reactive components have been brought together is said reaction started and adhesive bonding effected. A separating layer (T) is therefore initially provided between the adhesive films F1 and F2, which separating layer is in such a form that it is initially impermeable to the reactive components but can be removed at least in part by means of a laser. At the points at which the separating layer has been removed, the reactive components R1 and R2 are able to come into contact and the reaction occurs.

This procedure allows the reactive adhesive film system to be supplied in the form of an adhesive tape which is composed of at least the two adhesive films (F1 and F2) and the separating layer arranged therebetween—in particular over the entire surface. As a result of the separation, the adhesive tape can be stored without an activation reaction taking place during storage. Such adhesive tapes can be wound into a roll, for example, and supplied to the user in that form, in particular if at least one or optionally both of the exposed adhesive film surfaces have previously been provided with a protective covering. This in particular prevents the outsides of the adhesive films from coming into contact during winding.

Purely for the purposes of linguistic differentiation, one of the adhesive films (F1) is also referred to hereinbelow as the "first adhesive film" and, according to corresponding conventions of speech, the first adhesive film comprises the "first reactive component" as the reactive component (R1). The other adhesive film (F2) is also referred to hereinbelow as the "second adhesive film", and the reactive component (R2) in this second adhesive film is referred to as the "second reactive component".

Adhesive tapes within the meaning of this specification are flat products which are adhesive on one side or on both sides. Adhesive tapes can be in the form of single-layer systems, that is to say in the form of backing-free, in particular thin adhesive films, which are also referred to as transfer adhesive tapes. In another form, adhesive tapes can have one or more backing layers, which in particular impart an inherent stability to the adhesive tape or increase the inherent stability.

The thickness of conventional adhesive tapes frequently ranges in practice from a few micrometres to several millimetres and is conventionally significantly smaller than the extent in the spatial directions in the plane. The extent in the two spatial directions in the plane is not to be limited by the term "adhesive tape". Frequently, however, adhesive tapes are provided in strip form, so that the extent in one direction in the adhesive tape plane is significantly greater than in the direction lying perpendicular thereto in the plane. Since the adhesive tape can frequently be cut to length many times in its longest extent into adhesive tape lengths required for application, this direction in such forms of the adhesive tape can also be regarded as being "infinite". The adhesive tapes in question are frequently wound in that direction to provide a roll (Archimedean spiral).

For better handling or for processing purposes, adhesive tapes—in particular those in strip form—are frequently covered on one side or on both sides with a protective material, in particular a protective material with anti-adhesive properties, such as a release paper, a release film or the like. Such protective films are removed for use in order to expose the outer layer of adhesive.

Within the meaning of this specification, the term "adhesive tape" also includes ready-made adhesive tape portions, that is to say, for example, adhesive tape portions of in principle any desired shape which have been die-cut, cut or cut to length from a long tape, which are also referred to as labels.

Within the meaning of this specification, "activation"—in accordance with the generally applicable definition—refers to a process by which specific substances are brought into a more reactive, "activated" state. In the narrower sense, activation of the adhesive system means that, as a result of the reactive activated state, a reaction—the activation reaction—is set in motion, by means of which the adhesive system either a) is actually converted into an adhesive state or b) for the first time develops the adhesive forces required for the intended use to a sufficient degree. The reaction can be, for example, a polymerization reaction, a polymer-analogous reaction, a crosslinking reaction or a curing reaction. The reaction requires the presence of both reactive components, or the activated forms thereof.

The separating layer is in such a form that it is impermeable to both reactive components.

The separating layer of the adhesive system according to the invention can in particular be a metal layer. This can be a metal foil, which is introduced between the adhesive films during manufacture of the adhesive tape; for example by a laminating process.

The separating layer can also be produced in an outstanding manner by vapour deposition, sputtering, electrostatic coating or another method of applying the separating layer material in particulate, atomic, ionic or molecular form, in particular of metals, metal oxides or the like. This can take place, for example, on one of the adhesive films (F1 or F2), before the other adhesive film is applied thereto by lamination or coating, or to both adhesive films on the respective surfaces thereof that subsequently face one another. In the case of multi-layer systems, which in particular are composed of first and second adhesive films in an alternating sequence, a separating coating can also be applied, for example, to one side of each of the adhesive films in question and the lamination can then take place in such a manner that an uncoated side is in each case applied to a coated side of the adjacent adhesive film.

The separating layer provided according to the invention is very preferably present between the two adhesive films F1 and F2 over the entire surface and in the form of a closed layer, in order to ensure the best possible barrier effect for the reactive components. The separating layer provided according to the invention is advantageously used in thicknesses of from 50 nm to 2000 nm, but in particular embodiments of the invention it may also be thinner or thicker.

Aluminium has been found to be outstandingly suitable as the metal. Pure metal layers provide a high barrier effect against migration and diffusion of the reactants.

Further advantageously, layers of metal oxide (MeOx layers) can be used according to the invention as separating layers. Advantageous metal oxide layers consist, for example, of silicon dioxide ($SiO_2$), titanium dioxide ($TiO_2$) or zinc-tin oxide (ZnSnO), or they comprise one or more of these metal oxides.

Advantageously, the coating is deposited (in particular by metals—such as, for example, aluminium—or metal oxides—such as, for example, $SiO_2$, $TiO_2$ and/or ZnSnO) over the entire surface and in the form of a closed layer. The layer thicknesses produced preferably have a thickness of from 50 nm to 2000 nm. The metal or metal oxide layer is optimally produced by coating by means of sputtering processes. Sputtering ("sputter coating"), also called cathodic sputtering under high vacuum, means the removal or ejection of material from a solid by means of high-energy ion bombardment, in order to coat a substrate with the ejected material. The magnetron sputtering process, which can be used according to the invention, is a so-called PVD process (physical vapour deposition). The stable vacuum coating process permits high uniformity and purity of the layer. The procedure is preferably such that the coating source (sputtering source) generates a low-pressure plasma from a noble gas (typically argon), which takes place in a vacuum chamber in the pressure range from $10^{-3}$ to $10^2$ mbar. The starting material for the layer is the so-called target, which is situated in the sputtering source. The sputtering procedure is technically at a very high level and is also suitable as the manufacturing process for mass production. However, galvanic electrolysis or the CVD (chemical vapour deposition) process can also be used to generate barrier layers.

The separating layer, in particular metal layer or metal oxide layer, reconditions after laser irradiation into nanoscale metal oxide beads in the boundary surface and enables diffusion of the reactive components. The metal or metal oxide is sublimed from solid to gaseous by the high pulse power density in the laser focus and is converted into the solid state of aggregation again by cooling. Since the metal is present in small layer thicknesses and the metal does not generate gaseous secondary products, the two boundary surfaces of the reactive adhesives are able to come into contact.

The separating layers can be removed by a laser, in particular by ablation or sublimation. The procedure is in particular such that irradiation is performed through one adhesive film or through a plurality of layers of the adhesive system by means of the laser. In multi-layer systems, a plurality of separating layers can also be removed in succession (also simultaneously). The separating layer can thereby be removed from the entire surface, or removal is carried out only in one or more regions. It is thereby possible to control the size of the contact area, and the kinetics of the reaction, or of the initiation operation, can be influenced.

Conventional standard lasers can in principle be used as the laser. The laser wavelength used is preferably so chosen that the laser radiation is able to emit with maximum transmission through the adhesive films and any other layers of the adhesive tape. In the wavelength range from 800 to 2000 nm, conventional acrylate pressure sensitive adhesives, for example, exhibit no or only very slight absorptiveness. The adhesive systems according to the invention are also translucent in this range.

Preference is given to the use of solid-state lasers, the wavelength of which is outstandingly suitable for irradiating conventional adhesives and release materials. Nd:YAG solid-state lasers are particularly preferably used. A Nd:YAG laser (short for neodymium-doped yttrium-aluminium-garnet laser) is a solid-state laser which uses a neodymium-doped YAG crystal as the active medium and emits mostly infra-red radiation with a wavelength of 1064 nm. Further transitions exist at 946 nm, 1320 nm and 1444 nm. The wavelength of the emitted light of this laser is—as described above—in the region of 1.064 μm. This wavelength is generally not absorbed by the adhesive films used, so that these materials are translucent for the wavelength in question. In addition release liners—for example of polyethylene terephthalate (PET)—can also be irradiated with this wavelength without being damaged, so that any release liners present do not have to be covered before the adhesive system according to the invention is activated. The radiation can be converted into different wavelengths, if required, by generating the second (532 nm) and third (355 nm) harmonics.

In principle, however, all gas lasers, dye lasers, solid-state lasers, metal vapour lasers and excimer lasers having the suitable wavelengths are suitable.

There are used as adhesive systems those systems that consist of at least two adhesive films, a first reactive component being present in the first adhesive film and a second reactive component being present in the second adhesive film. If the two reactive components are brought together, the activation reaction starts and the adhesive system is activated.

The reactive components (R1 and R2) can in particular be so chosen i) that they are able to react with one another, or ii) that they each react with further components of the adhesive films but not directly with one another, or iii) that they are able to react both with one another and with further components of the adhesive films.

In an advantageous procedure, the activation reaction is a polymerization reaction. It is advantageous in this respect if, in one or both adhesive film(s), there are present in a matrix, which results in a basic structure of the corresponding adhesive film, reactive monomers or reactive resins which can be polymerized.

Preferably, the first reactive adhesive film (F1) comprises a polymeric film former matrix (a), at least one reactive monomer or reactive resin (b) and, as the reactive component (R1), at least one initiator, in particular radical initiator (c). The second reactive adhesive film (F2) comprises a polymeric film former matrix (a), at least one reactive monomer or reactive resin (b) and, as the reactive component (R2), at least one activator (d).

Reactive adhesive films according to the invention can be produced in particular by a process which comprises the following steps:
1. dissolving and/or finely distributing the ingredients in one or more solvent(s) and/or water,
2. mixing the dissolved or finely distributed ingredients,
3. coating a release liner or paper, a backing material or a pressure sensitive adhesive with the mixture of dissolved or distributed ingredients according to step 2,
4. evaporating the solvent and/or water, and
5. optionally rolling the reactive adhesive film to form a roll, the ingredients including a polymeric film former matrix, at least one reactive monomer or reactive resin and, as the reactive component, a reagent selected from an initiator, in particular a radical initiator, and an activator.

Steps 1. and 2. can also take place in one step, that is to say the ingredients are dissolved and/or finely distributed simultaneously.

In a further embodiment according to the invention, the reactive adhesive films according to the invention can be produced by a solvent- and water-free process. Formulations for reactive adhesive films according to the invention are correspondingly produced by the action of heat and/or shear, for example in a hotmelt kneader or compounding extruder.

The adhesive films according to the invention very preferably consist of a matrix, called the polymeric film former matrix hereinbelow, in which the reactive monomers to be polymerized and/or reactive resins are contained. The purpose of this matrix is to form an inert basic framework for the reactive monomers and/or adhesive resins, so that they are not present in liquid form but are incorporated in a film or foil. Easy handling is thus ensured.

Suitable film former matrices for use in the present invention are preferably selected from the following list: a thermoplastic polymer, such as, for example, a polyester or copolyester, a polyamide or copolyamide, a polyacrylic acid ester, an acrylic acid ester copolymer, a polymethacrylic acid ester, a methacrylic acid ester copolymer, thermoplastic polyurethanes as well as chemically or physically cross-linked substances of the compounds mentioned above. In addition, blends of different thermoplastic polymers can also be used.

Furthermore, elastomers and thermoplastic elastomers, on their own or in a mixture, are also conceivable as the polymeric film former matrix. Thermoplastic polymers, in particular semi-crystalline thermoplastic polymers, are preferred.

Thermoplastic polymers having softening temperatures of less than 100° C. are particularly preferred. Within this context, the expression softening point denotes the temperature above which the thermoplastic granules adhere to themselves. If the constituent of the polymeric film former matrix is a semi-crystalline thermoplastic polymer, it very preferably has, in addition to its softening temperature (which is associated with the melting of the crystallites), a glass transition temperature of not more than 25° C., preferably not more than 0° C.

In a preferred embodiment according to the invention, a thermoplastic polyurethane is used. The thermoplastic polyurethane preferably has a softening temperature of less than 100° C., in particular less than 80° C.

In a particularly preferred embodiment according to the invention, Desmomelt 530®, which is obtainable commercially from Bayer Material Science AG, 51358 Leverkusen, Germany, is used as the polymeric film former matrix. Desmomelt 530® is a hydroxyl-terminated, largely linear, thermoplastic polyurethane elastomer with a high rate of crystallization.

According to the invention, the amount of polymeric film former matrix is in the range of approximately from 20 to 80% by weight, preferably approximately from 30 to 50% by weight, based on the total mixture of the constituents of the reactive adhesive film. Most preferably, from 35 to 45% by weight, preferably approximately 40% by weight, of the polymeric film former matrix, based on the total mixture of the constituents of the reactive adhesive film, are used. The total mixture of the constituents of the reactive adhesive film here denotes the total amount of the components used, which are the polymeric film former matrix (a), the reactive monomers or reactive resins (b), the reagent (c) as well as further components which are optionally present, which is obtained as a total (in % by weight).

As used herein, the reactive monomer or reactive resin is to denote a monomer or resin which is capable in particular of radical chain polymerization.

According to the invention, a suitable reactive monomer is selected from the group consisting of acrylic acid, acrylic acid esters, methacrylic acid, methacrylic acid esters, diacrylates, dimethacrylates, triacrylates, trimethacrylates, higher functional acrylates, higher functional methacrylates, vinyl compounds and/or oligomeric or polymeric compounds having carbon-carbon double bonds.

In a preferred embodiment, the reactive monomer is one or more representatives selected from the group consisting of: methyl methacrylate (CAS No. 80-62-6), methacrylic acid (CAS No. 79-41-4), cyclohexyl methacrylate (CAS No. 101-43-9), tetrahydrofurfuryl methacrylate (CAS No. 2455-24-5), 2-phenoxyethyl methacrylate (CAS No. 10595-06-9), hydroxyalkyl methacrylates, in particular 2-hydroxyethyl methacrylate (CAS No. 868-77-9), 2-hydroxypropyl methacrylate (CAS No. 923-26-2 and 27813-02-1), 4-hydroxybutyl methacrylate (CAS No. 29008-35-3 and 997-46-6), di(ethylene glycol) methyl ether methacrylate (CAS No. 45103-58-0) and/or ethylene glycol dimethacrylate (CAS No. 97-90-5).

In a further preferred embodiment according to the invention, the reactive adhesive film comprises a mixture of cyclohexyl methacrylate, tetrahydrofurfuryl methacrylate, methacrylic acid and ethylene glycol dimethacrylate as the reactive monomers to be polymerized.

In a further preferred embodiment according to the invention, the reactive adhesive film comprises a mixture of 2-phenoxyethyl methacrylate, 2-hydroxyethyl methacrylate, 2-hydroxypropyl methacrylate and ethylene glycol dimethacrylate as the reactive monomers to be polymerized.

In a further preferred embodiment according to the invention, the reactive adhesive film comprises a mixture of 2-phenoxyethyl methacrylate, 2-hydroxyethyl methacrylate and ethylene glycol dimethacrylate as the reactive monomers to be polymerized.

In a further preferred embodiment according to the invention, the reactive adhesive film comprises 2-phenoxyethyl methacrylate as the reactive monomer to be polymerized.

In a further preferred embodiment according to the invention, the reactive adhesive film comprises a mixture of methyl methacrylate, methacrylic acid and ethylene glycol dimethacrylate as the reactive monomers to be polymerized.

In a further preferred embodiment according to the invention, the reactive adhesive film comprises a mixture of 2-phenoxyethyl methacrylate and ethylene glycol dimethacrylate as the reactive monomers to be polymerized.

In a further preferred embodiment according to the invention, the reactive adhesive film comprises a mixture of di(ethylene glycol) methyl ether methacrylate and ethylene glycol dimethacrylate as the reactive monomers to be polymerized.

Oligomeric mono-, di-, tri- and higher-functionalized (meth)acrylates can be chosen as the reactive resin(s). They are very advantageously used in a mixture with at least one reactive monomer.

Each of these preferred embodiments can be combined according to the invention with a thermoplastic polyurethane, such as, for example, Desmomelt 530®, as the polymeric film former matrix.

According to the invention, the amount of reactive monomer/reactive monomers/reactive resin/reactive resins is in the range of approximately from 20 to 80% by weight, preferably approximately from 40 to 60% by weight, based on the total mixture of the constituents of the reactive adhesive film. Most preferably, approximately from 40 to 50% by weight of the reactive monomer/reactive monomers/reactive resin/reactive resins, based on the total mixture of the constituents of the reactive adhesive film, are used. The total mixture of the constituents of the reactive adhesive film here denotes the total amount of the components used, which are the polymeric film former matrix (a), the reactive monomers or reactive resins (b), the reagent (c) as well as further components which are optionally present, which is obtained as a total (in % by weight).

As used herein, the term initiator, in particular radical initiator or radical-forming substance (or also curing agent), denotes a compound which is able to initiate a polymerization reaction or crosslinking of the adhesive. However, the initiator, in particular radical initiator, participates to a very small extent in the reaction process and consequently does not form a polymer component that determines the properties of the adhesive bond.

In the present invention, an initiator, in particular radical initiator, is added to the at least one first reactive adhesive film of the adhesive system.

Radical initiators are preferred. Any radical initiators known in the prior art can be used. Preferred radical initiators are peroxides, hydroperoxides and azo compounds.

In a particularly preferred embodiment according to the invention, the radical initiator is an organic peroxide or hydroperoxide. α,α-Dimethylbenzyl hydroperoxide, which is also known as cumene hydroperoxide (CAS No. 80-15-9), is particularly preferred. Also preferred are diisopropylbenzene hydroperoxide (CAS No. 26762-93-6), p-menthane hydroperoxide (CAS No. 26762-92-5) and 1,1,3,3-tetramethylbutyl hydroperoxide (CAS No. 5809-08-5).

According to the invention, the amount of radical initiator is in the range of approximately from 3 to 30% by weight, preferably approximately from 8 to 15% by weight, based on the total mixture of the constituents of the reactive adhesive film. Most preferably, approximately from 9 to 11% by weight of radical initiator, based on the total mixture of the constituents of the reactive adhesive film, are used. The total mixture of the constituents of the reactive adhesive film here denotes the total amount of the components used, which are the polymeric film former matrix (a), the reactive monomers or reactive resins (b), the reagent (c) as well as further components which are optionally present, which is obtained as a total (in % by weight).

As used herein, the term activator denotes a compound which, even at very low concentrations, allows for the first time or accelerates the process of polymerization. Activators can also be called accelerators.

In the present invention, an activator is added to the at least one second, reactive adhesive film of the adhesive system.

Suitable activators for use in the present invention when a radically polymerizable system is to be activated are, for example, selected from the group consisting of: an amine, a dihydropyridine derivative, a transition metal salt or a transition metal complex.

Tertiary amines in particular are used for activating the radical-forming substance.

In a first preferred embodiment according to the invention, the activator is 3,5-diethyl-1,2-dihydro-1-phenyl-2-propylpyridine (also called PDHP, CAS No. 34562-31-7).

According to the invention, the amount of this activator is in the range from greater than 0 to approximately 40% by weight, preferably approximately from 15 to 25% by weight, based on the total mixture of the constituents of the reactive adhesive film. Most preferably, approximately from 16 to 22% by weight, yet more preferably from 18 to 20% by weight, of activator are used, based on the total mixture of the constituents of the reactive adhesive film. The total mixture of the constituents of the reactive adhesive film here denotes the total amount of the components used, which are the polymeric film former matrix (a), the reactive monomers or reactive resins (b), the reagent (c) as well as further components which are optionally present, which is obtained as a total (in % by weight).

In a further very preferred embodiment of the invention, a complex compound having a manganese, iron or cobalt ion as the central atom and a compound containing carbon-nitrogen double bonds as ligand is used as the activator. The compound containing carbon-nitrogen double bonds is in anionic form in the complex compound. The manganese, iron or cobalt ion is doubly positively charged in the complex compound, while the compound containing carbon-nitrogen double bonds is doubly negatively charged. The manganese, iron or cobalt ion in the complex compound replaces in each case two hydrogen atoms which the ligand carried on the nitrogen atoms prior to the reaction to form the complex compound.

The ligand advantageously has a cyclic structure, preferably a porphyrin, porphyrazine or phthalocyanine ring structure. These structures are to be understood as being framework structures. The ligands can optionally carry substituents in place of the H atoms bonded to carbon atoms. In this case, they are referred to as derivatives of those compounds. Suitable substituents are selected from the group consisting of fluorine, chlorine, bromine, iodine, methyl, ethyl, propyl, isopropyl, butyl, tert-butyl, —OH, —NH$_2$, —NO$_2$.

A particularly suitable activator of this variant embodiment comprises iron(II) phthalocyanine (CAS No. 132-16-1).

In the case of the use of complex compounds, the amount of activator is in the range of from greater than 0 to approximately 10% by weight, preferably approximately from 0.1 to 5.0% by weight. Most preferably, approximately from 0.2 to 3.0% by weight, yet more preferably from 0.5 to 2.0% by weight, of activator, based on the total mixture of the constituents of the reactive adhesive component, are used. The total mixture of the constituents of the reactive adhesive component here denotes the total amount of the components used, which include the reactive monomers or reactive resins (a), the activator (b), the radical initiator (c), the polymeric film former matrix (d) and/or further components which are optionally present, which is obtained as a total (in % by weight).

As used herein, the term crosslinker denotes chemical compounds which are capable of providing linear molecule chains with reactive functional groups so that three-dimensionally crosslinked structures are able to form from the two-dimensional structures by the formation of intermolecular bridges.

Typical examples of crosslinkers are chemical compounds which have two or more identical or different functional groups within the molecule or at the two molecule ends and consequently are able to crosslink molecules of the same structure or of different structures with one another. A crosslinker is additionally able to react with the reactive monomer or reactive resin, as defined above, without the occurrence of a polymerization as such. This is because a crosslinker, unlike the activator, as described above, can be incorporated into the polymer network.

In a particularly preferred embodiment according to the invention, ethylene glycol dimethacrylate (CAS No. 97-90-5) is used as a crosslinker and/or reactive monomer (see above).

Preferred crosslinkers are in addition diacrylates, dimethacrylates, triacrylates, trimethacrylates, higher functional acrylates and/or higher functional methacrylates.

The reactive adhesive films of the present invention can optionally comprise further additives and/or auxiliary substances which are known in the prior art. Examples which may be mentioned here include fillers, colourants, colouring pigments, nucleating agents, rheological additives, blowing agents, adhesion-enhancing additives (adhesion promoters, tackifier resins), adhesives, pressure sensitive adhesives, compounding agents, plasticizers and/or anti-ageing agents, light stabilizers and UV stabilizers, for example in the form of primary and secondary antioxidants.

In a preferred embodiment according to the invention, the at least one first adhesive film (F1) comprises a mixture of the following constituents: thermoplastic polyurethane, in particular Desmomelt 530®, cyclohexyl methacrylate, tetrahydrofurfuryl methacrylate, methacrylic acid, ethylene glycol dimethacrylate and cumene hydroperoxide.

In a further preferred embodiment according to the invention, the at least one first adhesive film (F1) comprises a mixture of the following constituents: thermoplastic polyurethane, in particular Desmomelt 530®, methyl methacrylate, methacrylic acid, ethylene glycol dimethacrylate and cumene hydroperoxide.

In a further preferred embodiment according to the invention, the at least one first adhesive film (F1) comprises a mixture of the following constituents: thermoplastic polyurethane, in particular Desmomelt 530®, 2-phenoxyethyl methacrylate, ethylene glycol dimethacrylate and cumene hydroperoxide.

In a further preferred embodiment according to the invention, the at least one first adhesive film (F1) comprises a mixture of the following constituents: thermoplastic polyurethane, in particular Desmomelt 530®, di(ethylene glycol) methyl ether methacrylate, ethylene glycol dimethacrylate and cumene hydroperoxide.

Each of these preferred embodiments according to the invention comprises approximately from 20 to 80% by weight thermoplastic polyurethane, approximately from 20 to 80% by weight reactive monomer(s) and approximately from 3 to 30% by weight cumene hydroperoxide, preferably approximately from 30 to 50% by weight thermoplastic polyurethane, approximately from 40 to 60% by weight reactive monomers and approximately from 8 to 15% by weight cumene hydroperoxide, based on the total mixture of the constituents of the reactive adhesive film.

In a preferred embodiment according to the invention, the at least one second adhesive film (F2) comprises a mixture of the following constituents: thermoplastic polyurethane, in particular Desmomelt 530®, cyclohexyl methacrylate, tetrahydrofurfuryl methacrylate, methacrylic acid, ethylene glycol dimethacrylate and PDHP.

In a further preferred embodiment according to the invention, the at least one second adhesive film (F2) comprises a mixture of the following constituents: thermoplastic polyurethane, in particular Desmomelt 530®, methyl methacrylate, methacrylic acid, ethylene glycol dimethacrylate and PDHP.

In a further preferred embodiment according to the invention, the at least one second adhesive film (F2) comprises a mixture of the following constituents: thermoplastic polyurethane, in particular Desmomelt 530®, 2-phenoxyethyl methacrylate, ethylene glycol dimethacrylate and PDHP.

In a further preferred embodiment according to the invention, the at least one second adhesive film (F2) comprises a mixture of the following constituents: thermoplastic polyurethane, in particular Desmomelt 530®, di(ethylene glycol) methyl ether methacrylate, ethylene glycol dimethacrylate and PDHP.

Each of these preferred embodiments according to the invention comprises approximately from 20 to 80% by weight thermoplastic polyurethane, approximately from 20 to 80% by weight reactive monomer(s) and from greater than 0 to approximately 40% by weight PDHP, preferably approximately from 30 to 50% by weight thermoplastic polyurethane, approximately from 40 to 60% by weight reactive monomer(s) and approximately from 15 to 25% by weight PDHP, based on the total mixture of the constituents of the reactive adhesive film.

As used herein, the total mixture of the constituents of the reactive adhesive film denotes the total amount of the components used, which are the polymeric film former matrix (a), the reactive monomer(s) and/or reactive resin(s) (b), the reagent (c) as well as further components which are optionally present, which is obtained as a total (in % by weight).

The first adhesive film (F1) and/or the second adhesive film (F2) generally have a layer thickness in the range of approximately from 20 to 200 µm, preferably approximately from 30 to 100 µm, more preferably approximately from 40 to 60 µm and particularly preferably approximately 50 µm. In order to produce greater layer thicknesses, it can be advantageous to laminate a plurality of adhesive film layers together.

In addition, in a very preferred procedure, the reactive adhesive film according to the invention is characterized in that it already has pressure sensitive adhesive properties before activation. Pressure sensitive adhesive substances are defined according to Römpp (Römpp Online 2013, document identifier RD-08-00162) as viscoelastic adhesives whose set, dried film is permanently tacky and remains adhesive at room temperature. Pressure sensitive adhesion takes place immediately to almost all substrates by the application of gentle pressure. Gentle pressure here means a pressure of greater than 0 bar, which is exerted for a period of more than 0 seconds.

In principle it is possible to arrange further layers between the adhesive films F1 and F2, provided that such a further layer is permeable at least to one of the reactive components, preferably to both reactive components. Such layers can be provided, for example, in order to increase the stability of the adhesive system. Such layers can be provided, for example, of materials which are permeable to at least one of the reactive components, and/or have openings, for example have a plurality of holes or possess a net structure.

The materials of such further layers are preferably inert towards the laser radiation.

The adhesive system according to the invention is supplied and/or used in particular in the form of an adhesive tape that is adhesive on both sides. For better handling—for example for storage, winding into a roll, transport, etc.—of such an adhesive tape, it is advantageous if the adhesive tape, prior to use, has been provided on at least one of the outer adhesive film surfaces, optionally on both outer adhesive film surfaces, with a protective covering ("release covering", "liner", "release liner"). This in particular prevents the outsides of the adhesive films from coming into contact during rolling up or from being stuck, dirtied or damaged during storage, transport or the like. The protective covering is then removed before the open adhesive surface is required for use.

As the material for the protective covering there can be used any materials known per se for that purpose, in particular materials having a release action; such materials are in particular anti-adhesive materials or anti-adhesively coated (in particular siliconized) materials, such as, for example, silicones, siliconized papers, glassine papers, coated or uncoated HDPE liners (low-pressure polyethylene), coated or uncoated LDPE liners (high-pressure polyethylene), coated or uncoated MOPP and BOPP liners (monoaxially or biaxially oriented polypropylene), coated or uncoated PET liners (polyethylene terephthalate) and the like.

The adhesive film system (adhesive system) according to the invention is characterized in that it comprises at least two reactive adhesive films F1 and F2, which are initially separated from one another by a laser-ablatable separating layer. The adhesive system according to the invention can optionally have further backings, release papers and/or release liners.

In a further development of the invention, the adhesive system according to the invention has a plurality of first adhesive films (F1) and/or a plurality of second adhesive films (F2), wherein in particular a first and a second adhesive film follow one another in an alternating manner, so that an adhesive system having three or more adhesive films is obtained and in particular a sequence F1-F2-F1(-F2 . . . ) or F2-F1-F2(-F1 . . . ) is achieved. Separating layers as described according to the invention (and optionally further layers—in particular layers which are permeable to the reactive components—as described) can thereby be provided between all the adhesive films. Alternatively, a laser-ablatable separating layer can be provided between two successive adhesive films of different types (F1 and F2), while such two-part adhesive film composites are separated from further two-part adhesive film composites of the same type by layers which are not laser-ablatable, and thus the adhesive system as a whole is built up. Instead of two-part composites, it is also possible for larger adhesive film composites, in which the more than two adhesive films of different types are in each case separated by laser-ablatable separating layers, to be separated from the adjacent adhesive film composites of the adhesive system by layers which are not laser-ablatable. The entire adhesive system can be composed of adhesive film composites of identical construction or of different construction and in particular can also comprise further layers.

By means of the method according to the invention, some or all of the separating layers are then removed wholly or in part, so that activation of the adhesive system occurs. The activation reaction then takes place throughout the entire adhesive system or in each of the described adhesive film composites.

The activation reaction particularly advantageously proceeds in such a manner that the adhesive system crosslinks and cures as soon as the first and the second reactive adhesive film F1 and F2 are brought into contact over a large area—particularly advantageously under moderate pressure, preferably from 0.5 to 3 bar, at room temperature (23° C.)—by removal of the separating layer at least in part. Higher or lower temperatures are optionally also possible. The mentioned moderate pressure is in particular to be achieved by hand. According to the invention, the contact time at room temperature is from a few seconds to a few minutes, preferably from 10 to 60 seconds. The pressure can be applied mechanically or manually.

Furthermore, the reactive adhesive system of the invention can comprise further films, layers, adhesives, as well as permanent and or temporary backings.

Suitable backing materials are known to a skilled person in the field. For example, films (polyester, PET, PE, PP, BOPP, PVC, polyimides), nonwovens, foams, woven fabrics and/or fabric foils can be used as permanent backings. Temporary backings should be provided with a release layer, wherein the release layer generally consists of a silicone release coating or a fluorinated release coating or is polyolefinic in nature (HDPE, LDPE).

It may be necessary to pretreat the surfaces of the substrates to be adhesively bonded by means of a physical, chemical and/or physico-chemical method. The application of a primer or of an adhesion promoter composition, for example, is advantageous in this case.

Suitable substrates which are suitable for adhesive bonding by means of the reactive adhesive system according to the invention are metals, glass, wood, concrete, stone, ceramics, textiles and/or plastics materials. The substrates to be adhesively bonded can be the same or different.

In a preferred embodiment, the reactive adhesive system according to the invention is used for adhesively bonding metals, glass and plastics materials. In a particularly preferred embodiment according to the invention, polycarbonates and anodized aluminium are adhesively bonded.

The metal substrates which are to be adhesively bonded can generally be manufactured from any common metals and metal alloys. Metals such as, for example, aluminium, stainless steel, steel, magnesium, zinc, nickel, brass, copper, titanium, iron-containing metals and alloys are preferably used. The parts to be adhesively bonded can additionally be composed of different metals.

Suitable plastics substrates are, for example, acrylonitrile-butadiene-styrene copolymers (ABS), polycarbonates (PC), ABS/PC blends, PMMA, polyamides, glass fibre reinforced polyamides, polyvinyl chloride, polyvinylene fluoride, cellulose acetate, cycloolefin copolymers, liquid crystal polymers (LCP), polylactide, polyether ketones, polyetherimide, polyethersulfone, polymethacrylmethylimide, polymethylpentene, polyphenyl ether, polyphenylene sulfide, polyphthalamide, polyurethanes, polyvinyl acetate, styrene-acrylonitrile copolymers, polyacrylates and polymethacrylates, polyoxymethylene, acrylic ester-styrene-acrylonitrile copolymers, polyethylene, polystyrene, polypropylene and/or polyesters, such as, for example, polybutylene terephthalates (PBT) and/or polyethylene terephthalate (PET).

Substrates can be painted, printed, metallized or sputtered.

The substrates to be adhesively bonded can assume any desired form which is required for the use of the resulting composite body. In the simplest form, the substrates are flat. In addition, three-dimensional substrates, which are sloping, for example, can also be adhesively bonded using the reactive adhesive system according to the invention. The substrates to be adhesively bonded can also have a wide variety of functions, such as, for example, casings, viewing windows, stiffening elements, etc.

The reactive adhesive films according to the invention are produced in a preferred procedure by the method described hereinbelow:

In a first step, the ingredients are dissolved or finely distributed in one or more solvent(s) and/or water. Alternatively, a solvent and/or water is not necessary because the ingredients are already completely soluble in one another (optionally with the action of heat and/or shear). Suitable solvents are known in the art, preference being given to the use of solvents in which at least one of the ingredients has good solubility. Acetone is particularly preferred.

As used herein, the term ingredient includes either at least one reactive monomer (a), a radical initiator (b) and a polymeric film former matrix (d) or at least one reactive monomer (a), an activator (b) and a polymeric film former matrix (d) as well as optionally further additives and/or auxiliary substances as defined above.

The dissolved or finely distributed ingredients are then mixed in a second step. Conventional stirring devices are used to produce the mixture. The solution is optionally additionally heated. The ingredients are optionally dissolved or finely distributed and mixed simultaneously.

The first step and the second step can also take place in one step, that is to say the ingredients are dissolved and/or finely distributed simultaneously.

In a third step, a release paper, a backing material or a pressure sensitive adhesive is then coated with the mixture of the dissolved or finely distributed ingredients according to step 2. Coating is carried out by the conventional techniques known in the art.

After the coating, the solvent is removed in a fourth step by evaporation.

The reactive adhesive film can optionally be wound up into a roll in a further step.

For storage, the reactive adhesive films according to the invention are covered with a release liner or release paper.

Alternatively, the reactive adhesive films according to the invention are produced in a solvent- and water-free manner by extrusion, hot melt nozzle coating or calendering.

Finally, a composite is provided according to the invention which is bonded by means of the reactive adhesive system according to the invention, as defined above.

The adhesive film system according to the invention offers a number of advantages over the systems as are known in the prior art.

The adhesive film system can be supplied to the user in the form of a complete composite (as a prefabricated adhesive tape), and it is not necessary to use two components which are initially separate.

It is further possible—and in many cases also advantageous—not to carry out the laser treatment until shortly before use or shortly before adhesive bonding, so that adhesive tapes (strips, die-cut pieces, etc.) can be arranged on the components and the components can optionally already be brought into their final arrangement; this is the case in particular when at least one of the parts is permeable to laser beams. Such preliminary products can then even be stored. In conventional systems, which react as soon as contact takes place, this is not possible.

The activation of multi-layer systems—that is to say systems that have more than two adhesive films (F1 and F2) in an alternating sequence—is simplified since it is possible initially to prevent critical contact by means of separating layers. The laser can then effect sublimation of a plurality of separating layers in depth for activation.

The invention claimed is:

1. Reactive adhesive film system comprising a first film and a second film, wherein:
   the first film comprises a first adhesive component;
   the second film comprises a second adhesive component;
   the first adhesive component comprises a first reactive component;
   the second adhesive component comprises a second reactive component;
   a separating layer is disposed between the first film and the second film;
   the separating layer is impermeable to the first reactive component and the second reactive component;
   the separating layer has a thickness of from 50 to 2,000 nm; and
   activation of the reactive adhesive film system being effected by a reaction requiring the presence of the first reactive component and the second reactive component and contact between the first film and the second film.

2. Reactive adhesive film system according to claim 1, wherein the separating layer is laser-ablatable.

3. Reactive adhesive film system according to claim 1, wherein the second reactive component comprises an activator.

4. Reactive adhesive film system according to claim 3, wherein:
   the activator comprises an activator selected from the group consisting of a manganese (II) complex, an iron (II) complex, and a cobalt (II) complex; and
   the second adhesive component further comprises a ligand selected from the group consisting of a porphyrin, a porphyrazine, a phthalocyanine, and a derivative thereof.

5. Reactive adhesive film system according to claim 1, wherein:

the first adhesive component further comprises a first polymeric film-former matrix;

the second adhesive component further comprises a second polymeric film-former matrix; or the first adhesive component further comprises a first polymeric film-former matrix and the second adhesive component further comprises a second polymeric film-former matrix.

6. Reactive adhesive film system according to claim 1, wherein the separating layer comprises a metal.

7. Reactive adhesive film system according to claim 6, wherein the metal comprises a metal selected from the group consisting of aluminum, titanium, and zinc.

8. Reactive adhesive film system according to claim 6, wherein the metal comprises aluminium.

9. Reactive adhesive film system according to claim 1, wherein the separating layer comprises a layer of at least one metal oxide.

10. Reactive adhesive film system according to claim 9, wherein the layer of at least one metal oxide comprises a metal oxide selected from the group consisting of titanium dioxide ($TiO_2$) and zinc-tin oxide (ZnSnO).

11. Reactive adhesive film system according to claim 1, wherein the first reactive component comprises at least one of a radical initiator, a reactive monomer, and a reactive resin.

12. Reactive adhesive film system according to claim 1, wherein the separating layer comprises silicon dioxide ($SiO_2$).

13. Method comprising:
providing the reactive adhesive film system according to claim 1; and
ablating the separating layer with a laser.

14. Method according to claim 13, wherein the laser is a Nd:YAG solid-state laser.

15. Method according to claim 13, wherein the second reactive component comprises an activator.

16. Method according to claim 15, wherein: the activator comprises an activator selected from the group consisting of a manganese (II) complex, an iron (II) complex, and a cobalt (II) complex; and the second adhesive component further comprises a ligand selected from the group consisting of a porphyrin, a porphyrazine, a phthalocyanine, and a derivative thereof.

17. Method according to claim 13, wherein:
the first adhesive component further comprises a first polymeric film-former matrix;
the second adhesive component further comprises a second polymeric film-former matrix; or
the first adhesive component further comprises a first polymeric film-former matrix and the second adhesive component further comprises a second polymeric film-former matrix.

18. Method according to claim 13, wherein the separating layer comprises a metal.

19. Method according to claim 18, wherein the metal comprises a metal selected from the group consisting of aluminum, titanium, and zinc.

20. Method according to claim 18, wherein the metal comprises aluminium.

21. Method according to claim 13, wherein the separating layer is a layer of a metal oxide.

22. Method according to claim 21, wherein the layer of a metal oxide comprises a metal oxide selected from the group consisting of titanium dioxide ($TiO_2$) and zinc-tin oxide (ZnSnO).

23. Method according to claim 13, wherein the separating layer has a thickness of from 50 to 2,000 nm.

24. Method according to claim 13, wherein the first reactive component comprises at least one of a radical initiator, a reactive monomer, and a reactive resin.

25. Method according to claim 13, wherein the separating layer comprises silicon dioxide ($SiO_2$).

26. Reactive adhesive film system comprising a first film and a second film, wherein:
the first film comprises a first adhesive component;
the second film comprises a second adhesive component;
the first adhesive component comprises a first reactive component;
the second adhesive component comprises a second reactive component;
a separating layer is disposed between the first film and the second film;
the separating layer has a thickness of from 50 to 2,000 nm;
the separating layer comprises a metal; and
activation of the reactive adhesive film system being effected by a reaction requiring the presence of the first reactive component and the second reactive component and contact between the first film and the second film.

* * * * *